United States Patent Office 3,846,297
Patented Nov. 5, 1974

3,846,297
CHROMATOGRAPHY
Wallace Malcolm Thaw, 30 Woodside Drive,
Moraga, Calif. 90065
No Drawing. Filed Oct. 12, 1972, Ser. No. 297,014
Int. Cl. B01d 15/08
U.S. Cl. 210—31 C          10 Claims

ABSTRACT OF THE DISCLOSURE

Invention discloses a liquid-solid chromatographic process for the separation and recovery of liquid and dissolved organic and substituted organic compounds. A silica gel of a selected size, pore volume, and pore diameter is packed in a column and wetted with a mild desorber to maintain this gel in a wetted condition. The feed stock from which the paint vehicle or the like is to be separated is fed into the column, and individual solvents or stripping components selected from the proper solvent blends are used to wash the gel to desorb the feed components and to effect changes of solvent composition within the column. The more expensive solvents are removed from the feed stock by replacing them with other less expensive solvents after they are eluted from the gel. The less expensive or inexpensive solvents are used as diluents of fresh feed and also to keep the silica gel in a wetted condition to prevent channelization in the chromatographic column. Complete removal of solute from gel is accomplished by providing both desorption strength and solvency power. Some feed increments require special product recovery procedures. An alternative to gel reactivation by solvent exchange is the use of inert gas and temperatures of about 150 to 250° F. instead of current regeneration temperatures of 350° F. and up.

BACKGROUND OF THE INVENTION

Field of the Invention

This application related generally to chromatographic columns, and more particularly to a process of liquid-solid chromatographic separation of organic liquids.

DESCRIPTION OF THE PRIOR ART

Chromatography was discovered by the Russian botanist M. Tswett, who first observed that colored solutes could be separated selectively by passing them through a tube of suitable adsorbent. Chromatography has now come to mean experiments including colorless materials and describes the use of a mobile phase to wash substances through a column containing liquid or solid stationary phases.

Phase separations generally are utilized in solvent extraction of materials that cannot be volatilized and has wide application in the oil and fat purification process, petroleum refining, pharmaceutical preparation, beet sugar refining, instant coffee manufacturing, and metal purification. Some work has been done of extracting one resinous substance from another by means of the differences in solubility of the sample in one liquid as compared to another. In particular, non-volatile vehicles portions of paint have been separated into their component parts to a limited extent. This is primarily accomplished by diluting the vehicle with weak solvents so that precipitation of the least soluble molecules will take place. To date, however, no effective and efficient means of delineating molecular species of the film forming type has been accomplished.

"Paper," or "thin layer" chromatography is a known micro-method in which a drop of liquid to be investigated is placed on or near the end of a strip of paper. The end in which the drop is placed is immersed in solvent which travels down the paper and then selectively distributes materials present in the original drop. Comparison with known substance is then possible in order to identify the materials being in the drop. However, this method requires only a small sample and the recovery of individual fractions for further analysis is impractical.

In the present invention, resins are used such as those in the alkyd varnishes. They have not been extensively separated because of a lack of experimental data on a process for separating same, and the fact that resins in many industries are low cost material which may be used as fuel or road paving. Processing such resins has often been considered uneconomical. The class of solutes contemplated in the present invention are feedstocks that are resinous, polymeric or similar compounds of medium to high molecular weight. They generally include oxygenated linking or substituent groups (ester linkages, OH groups, etc.) in an otherwise hydrogenated carbon chain and/or ring matrix. Other polar groups such as N and S may be present.

The present invention provides a process for economically dividing organic substances that will not withstand or are too heavy for vacuum distillation in large volume by providing an adsorbent with resolving power and structural capacity for such separations. Many provisions are made in the liquid stream to prevent column plugging and produce satisfactory results. The molecular weight of some of the product increments was around 15,000 showing the versatility of this invention.

Silica gel has been widely used by chemists as an adsorption media in gas and liquid chromatography, but has not been used in the capacity set forth in the present invention, nor in the selected sizes having the proper average pore diameter, mesh size and the like.

SUMMARY OF THE INVENTION

A process for the separation of organic liquids and dissolved molecules in a chromatographic column wherein a silica gel selected from those of proper mesh size, average pore diameter, and pore volume is utilized. The gel is placed in a column and wetted with a mild desorber to regenerate and prevent channeling in the gel. The feed stock is poured into the column over the gel, and single solvents or solvents combined by blend to arrive at the desired results are poured through the column to wash the gel and desorb desired high molecular compounds therefrom. Blending of solvents prior to their introduction to the column containing feed has the advantage of offering more control of the fractionation than the use of single desorbers.

The invention also comprises a liquid chromatographic column in which silica gel packed within the column has a mesh size of less than 100 and wherein the column is operated at a pressure of less than 1000 p.s.i. at a fast flow rate at around room temperature. It has been found that an average pore diameter of greater than 22 angstroms and/or a pore volume of more than 0.43 cc./gram, as measured by the manufacturers of silica gel, is to be preferred in liquid organic fractionations. In fact, resinous molecules will flow past gels of less porosity.

A low pressure, continuous flow operation with good resolution is provided. The gel is continuously submerged in a liquid or wetted to eliminate channelization and the use of assorted baffling devices now used in the known chromatographic columns. The residual solvent from one cycle is displaced by feed stock diluent for the next, thus restoring the gels adsorbing capability. Product components and desorbing solvents are recovered to effect an economical process.

OBJECTS OF THE INVENTION

It is, therefore, an object of the present invention to provide a process for separating medium and high molecular weight compounds at low pressures.

It is a further object of the invention to provide a process for the separation of medium and high molecular compounds at room temperature.

It is another object of the present invention to provide a process for the separation of medium and high molecular weight compound utilizing silica gel of medium and large mesh size and porosity requirements and which gel is wetter to prevent channelization thereof during the separation process.

It is a further object of the present invention to utilize solvent blends, in addition to single desorbers, to resolve materials into their component parts.

It is a further object of the present invention to substantially remove the solute from the gel in each cycle so that continuous flow operation is obtained without heating or cooling the gel bed.

It is still a further object of the present invention to provide a process for the separation of high molecular weight compound which will reduce operating costs and wherein expensive eluting solvents in feed stock material are replaced by inexpensive solvent, which inexpensive solvents wet the gel used in the process.

And it is still another object of the present invention to provide a practical (low pressure, good resolution, rapid flow, economical, operationally improved, liquid-solvent chromatographic process for the separation and recovery of liquid and dissolved organic and substituted organic compounds.

DESCRIPTION OF THE PREFERRED EMBODIMENTS

The present invention is a process wherein a liquid-solid phase chromatographic column utilizing silica gel as the packing material is used to selectively separate medium and high molecular weight compounds from feed stock at low pressure during rapid flow operation, with good resolution of the separated products.

Many of the problems needed to be overcome, such as the length of experimental time, column plugging, complexity, compatibility of solute in solution, the lack of product recovery procedure, and resin retention following alcohol desorption were deterents to previous chemists in this field, and have all been overcome by the present invention.

It has been found that common plugging often results when resins are poured over fine meshed gel. Pressure equipment could perhaps be used to overcome this difficulty, but upon investigation it was found that average mesh sizes less than 100, resin-solvent compatibility proper adsorbate fluidity, and/or maintaining the gel in a wetter condition overcame some of these above set forth problems.

A preferred embodiment of the invention is that the chromatographic column is packed with a selected silica gel adsorbent. It is preferred that the particle size be below about 100 mesh but that the pore volume be greater than 0.43 cc./gram and the average pore diameter be greater than 22 angstroms since rapid flow was obtained but very little adsorption occurred with a commercial silica gel having such properties. Silica gels having properties varying somewhat from the indicated values with regard to pore size were found to be operable.

Gel 58 produced by the Davison Chemical Company and having the following properties was utilized in experiments run by applicant. The particle size (tyler) was 30–65, the surface area was the 300 sq. m./gm., the pore volume was 1.15 cc./cm., and the average pore diameter was 140 angstroms. This gel was found to have the necessary pore volume, and/or average pore diameter and a mesh size consistent with a commercially feasible percolation rate and adsorbing capability. Prewetting the gel with a weak solvent, that is the same one used to dilute the feed resin, reduces the heat of resin adsorption and helps to prevent polymerization.

It is understandable that the column flow rate in liquid chromatography is governed by pressure, gel mesh size, and fluidity or viscosity of the moving liquid. The selection of diluent or initial solvent blend, if any, in dissolving or thinning the solute is based upon compatibility of one in the other. The amount of diluent to add to the feedstock is governed by compatibility and the liquid viscosity requirements of the system. The pressure, gel mesh size, and fluidity can be varied for maximum benefit with regard to contact time (reactor volume) and quantity of solvent to be recovered from feed. Ten minutes total solute contact time with gel was found to be quite adequate. This differs considerably with present procedures.

The solubility of resin in the liquid phase and its attraction to such as gel determines the fractionation of the material. It was found that the blending of mixed hexanes which are low molecular weight paraffins with the feed stock resin fed into the column was diluted enough that it could flow through the silica gel column. This is an example of use of one of the weaker organic diluents. Stronger diluents would be naphthenes, aromatic, and ketones in that order. In this connection, it should be pointed out that the solvency of the resin components in the eluting solvent is important.

Elution can be accomplished by using individual solvents. The end of the wash cycle may be determined by taking nonvolatile determinations on products cust. These determinations on the recovered eluent indicated that a washing cycle is complete when the NVM falls to about 0.5 percent or less. The amount of solvent that was used in each run was twice the total volume of gel and air space in the column in each desorption step, and this resulted in relatively complete elution of resinous components. The amount of solvent or blended solvents used in each wash or eluting step depends upon the degree of resolution desired. Changes in refractive indices are commonly known to be a means of governing commercially operating chromatographic processes.

In a preferred embodiment of the invention, the diluting solvents and desorbent solvents selected and/or blended for effecting the grandual elution of product increments is utilized. In addition, incompatible solvents may be used as adsorbent-desorption inhibitors. In this manner complete removal of resin and the like from gel is accomplished if the system is maintained at a sufficient solvency in the final stages of a cycle. This allows continuous flow and recycle operation of considerable duration. The final desorber used is preferably an azeotropic mixture of alcohol and true solvent, such as ethanol and methyl ethyl ketone. Cellosolves and methylene chloride would be suitable for tars, asphalts, or highly desorbed solutes.

Solvent blending was found to produce desirable desorbents. It was found that specific amounts of solute were desorbed from silica gel by solvent blends of definite composition. In each case, sufficient amounts of desorber were used to reduce the solute content in the eluent to less than 1%. By adding a paraffin to an aromatic, the amount of resin desorbed was reduced from around 40% to about 3%. Naphthenes were found to be different in that they did not have the inhibiting capability of paraffins. Desorption of solute is increased proportionately by blending aromatic solvent with a ketone. This provides fractionation of higher moleculer weight materials similar in extent to the fractionation of solvents by distillation. This solvent blending to achieve desorption is in addition to, but is not intended to supplant, the use of single solvent desorbers of varying strength. Physical constants obtained on eluted products indicate changes in chemical composition as desorption of feed from gel progresses.

The study of solvent blending lead to the complete removal of resin components from the gel by providing adequate liquid solvency as well as sufficient desorbing power. Azeotropic mixtures of alcohol with aromatics or ketones were found to be excellent final desorbers. Alcohols in themselves are excellent desorbers but do not have the characteristic of forming solutions with many high molecular weight compounds. Aromatics are reasonably good solvents but lack desorbing strength. Ketones are excellent solvents and good desorbers. Methyl ethyl ketone by itself was found to remove all but 5% or less of the feedstock from the gell in one study of resin removal. Cellosolves and other multi-oxygen atom containing solvents perform well as single component final desorbers.

The adsorption-desorption phenomenon exhibited by solid substances is the result of surface bonding needs of the exterior layer of atoms. Silica gel typifies materials that contain oxygen atoms. Activated charcoal is an example of materials that do not contain oxygen, but its function is the same in that, with the exception of diamonds, the carbon atoms are found to be composed of six membered rings linked together on the same plane so that some of the bonding energy is utilized to attract one layer to another. Silica gel has some inherent advantages over most other adsorbents due to the number of oxygen atoms on its surface, the unique qualities of the oxygen atoms of the $SiO_4$ structural units, the gel structural formation with regard to porosity, its durability, and its adsorbing capacity. The present invention indicates that adsorbents such as silica gel are to be manufactured so as to tailor gel porosity specifications to the size and/or shape of higher molecular weight solute molecules.

In the present invention, the adsorption by the silica gel is considered to be dependent upon, amongst other things, the internal electrical forces of the adsorbate molecules, i.e. the ability of one molecular specie to form a solution with another and the surface electron density or resonance of both gel and adsorbate. The internal electrical pressure and balance and/or the surface characteristics of the solute and solid molecules have much to do with their ability to form solutions or adhere to silica gel. The solute adsorbing gel functions in the same manner in adsorbing high molecular weight substances as in adsorbing lower molecular weight materials. However, this adsorption of the higher molecular weight substances would not involve the heat of condensation of a vapor to a liquid.

In order to perform correctly in the column, the silica gel must properly adsorb or attract the molecules of the feed stock poured into the column. This attraction of molecules to silica gel may also be described as a matter of hydrogen bonding. Hydrogen bonding is the result of the construction of the hydrogen atom and/or its function in regard to the unique capacity of the oxygen atom. Sharing of electron with adjacent atoms, rather than to one exclusively is called "electron resonance." Electron resonance is also characteristic of other atoms.

The oxygen atoms are more adapted to this function than carbon or nitrogen, as evidenced by methane and ammonia being gaseous at room temperature. Another feature of oxygen as compared to other elements normally found in the vapor state is that it is strongly attracted to a magnetic field. Adsorption of oxygen containing molecules on dry gel generally liberates more heat than the adsorption of hydrocarbons.

Resonance is a common feature of organic compounds. There are many more compounds in which two or more graphical formulas can be constructed, such as the basic aromatic benzene ring. The resonance of benzene occurs principally between two forms (1) and (2).

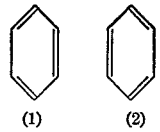

In a resonating molecule the distance between atoms is lessened. The molecule more stable than would be expected and oscillates between the two structures shown. This accounts for the adsorbence of aromatics over that of paraffins, both being composed of carbon and hydrogen.

The heat of adsorption of liquid into the silica gel is believed to be evidence of these effects, and is greater for the first layer of adsorbate molecules on the gel. The heat of adsorption of subsequent layers is somewhat less, and in the case of macromolecules, it is considered to be negligible. Hydrogen bonding accounts for the boiling point of water, in relation to its molecular weight, so it is likely that smaller molecules adhere to silica gel and other adsorbents in a number of layers.

The heat of adsorption on silica gel varies considerably depending upon the characteristics of the adsorbate molecules. It is applicant's belief that the actual heat adsorption is thus related to the quantum theory, and the radiation that develops results from the emission of energy as the electrons change in orbital path. The fundamental quantum theory equation that is believed to set forth this relationship is $E=hv$, where E is the difference in energy of the electron in different orbits of an atom, $v$ is the frequency, of radiation admitted by the atom, and $h$ is Planck's constant.

It could be assumed that some molecules more perfectly match those of the gel in regard to a resonance, electrodynamic forces, and interatomic distances. However, the replacement of strong desorbers on a gel by more weakly held solvent adsorbate in gel reactivation is believed to result from the cohesiveness of like molecules due to similar internal electrical pressure, electron resonance including the attraction of one highly adsorbed molecule by another, hydrogen bonding, the mobile energy of molecules, and the equalizing of chemical potentials.

The structural dimensions of the pores contained in the silica gel have an obvious effect on the size of molecules that can be adsorbed. Low pressures used in this process, that is from between 1000 p.s.i. to the use of atmospheres by placing a vacuum pump in the flash off solvent recovery section provide an improved process and system which has many proposed uses, such as the petroleum industry wherein the sulfur and nitrogen compounds of the residuum that is diluted to make diesel fuel (thereby combating smog) may be selectively removed. Previous study with substituted organic compounds of medium molecular weight, namely chlorinated wax, has shown that they can be separated according to the number of substituted atoms.

In experimental processes performed by the inventor, a glass apparatus was utilized at a pressure of no more than 10 p.s.i.g. formed satisfactory results with this glass column. In this way, it can be seen that equipment costs will be materially reduced and the need for engineering design of complex equipment will be substantially reduced.

In one preferred application of the process of the present invention, the separation of resinous matter whose exact nature is unknown, now accomplished at considerable cost or not at all, can be separated into its component parts in a continuous flow economical process.

One preferred embodiment of this invention is to use desorbers of low boiling range to expedite solvent removal from product cuts during vacuum distillation. The recovery of solvents can be accomplished in a Rotary flash evaporator in a prescribed manner. Desorbent solvent replacement is done during the thin film vacuum distillation by injecting azeotrope formers or higher boiling inexpensive solvents into the mixture. Cooling condensers for vapor condensation may be operated at around room temperature or less. Uncondensed vapors may be subject to refrigeration or collected by passing them countercurrent through a stream of feedstock or product increments.

The present process allows product recovery procedures for the quick drying or easily polymerized material at low temperatures, using low solute content having sufficient solvency during vacuum distillation. Antigelling inhibitors may be used in some cases.

The present process also eliminates channeling due to the continuous flow improvements of the solvent exchange elution procedure disclosed herein, and the gel reactivation of the present invention due to the wetting of the solvent provides economical advantages without requiring heating and cooling of the gel bed to produce reactivation.

The surface area of the gel used is one important factor in adsorption of gases and liquids, but the separation of organic liquids is also dependent on gel porosity. Together with the nature of the adsorbate molecules themselves in determining the heat of adsorption, gradual elution by utilizing solvent blends, mesh size which allows rapid flow at low pressure, complete removal of resin in each cycle, product recovery procedures, conservation of expensive desorbers, no heating and cooling of gel bed, and continuous flow recycle operation free of channeling are believed to be the main contributions of the applicant's present invention.

Other details of the operation of the process of the invention will be set forth in the following illustrative examples.

EXAMPLE I

The column was prewetted with a mixed low solvency solvent. A soya glycerol phthalate alkyd resin of 51% NVM and a Z viscosity was used. This resin was diluted to about 20% NVM and the solution was passed through the column using a 10 p.s.i. air drive. Forty grams of dry gel served as adsorbent.

run two were analyzed for acid anhydride, and the results may be seen in Table I.

TABLE I.—ACID ANHYDRIDE CONTENT OF DESORBED PRODUCT

| Cut: | Desorbent | Percent Solids eluted | P.A. |
|---|---|---|---|
| 1 | Xylene | 31.1 | 46.5 |
| 2 | do | 9.2 | 43.5 |
| 6 | MEK | 54.0 | 36.3 |

This data and other physical tests show that chemical composition of the eluted material changes during desorption.

EXAMPLE II

Alkyd resin as described in Example I was eluted from gel using successively trimethyl benzene, methyl ethyl ketone, and alcohol. Trimethyl benzene desorbed 42.6% of the feed which is about the same as with xylene. The cuts from this run were analyzed by infrared and gel permeation chromatography. The material eluted by TMB ranged from 40,000 relative molecular size to about 100 with a peak at about 3,200. The remaining molecules eluted with MEK were found to be about ten percent as large as those eluted with aromatic.

Infrared spectroscopy shows that the resin components changed in chemical composition though they were sim-

RECOVERED YIELDS OF PHTHALATE ALKYD RESIN

| Experiment | 1 | 2 | 3 | 4 | 5 | 6 |
|---|---|---|---|---|---|---|
| Gel grade number | 58 | 58 | 58 | 58 | 58 | 14. |
| Grams, resin* | 20 | 20 | 20 | 40 | 20 | 20. |
| Diluted to, ml | 50 | 65 | 70 | 120 | 105 | 50. |
| Diluent | Xylene | Benzene | Toluene | Benzene | Benzene | Xylene. |
| Extract: | | | | | | |
| 1st desorbent | do | do | do | do | do | Do. |
| Yield, wt. percent | 42.7 | 30.4 | 38.5 | 43.7 | 33.6 | 98.1. |
| 2d desorbent | MEK | MEK | MEK | Toluene | Toluene | Ethyl alcohol. |
| Yield, wt. percent | 54.0 | 65.0 | 59.4 | .99 | 0.1 | 1.9. |
| 3d desorbent | Ethyl alcohol | Ethyl alcohol | Ethyl alcohol | Xylene | Xylene | |
| Yield, wt. percent | 3.3 | 4.6 | 2.1 | 0.3 | 0.0 | |
| 4th desorbent | | | | Ethyl alcohol | Ethyl alcohol | |
| Yield, wt. percent | | | | 54.9 | 66.3 | |

*At 55% NVM.

Recovered non-volatile material was practically equal to the amount charged in all cases. Three to five milliliters of product were taken for NVM determinations. Product cuts were weighed and repeated rechecks confirmed experimental accuracy.

The tailing off of eluted resin between washings and subsequent resurgence of material with stronger desorbers were evidence of the adsorption-desorption phenomenon. Alkyd components are infinitely soluble in aromatics and ketones. Experiments one, two, and three show that xylene, toluene and benzene are in that order of elution strength. Runs two and five show that dilution of feed may result in a 10% difference in product yield. Run four indicates an overloading or exceeding of gel capacity and cannot be compared to the other results.

Run five showed that a slightly stronger aromatic solvent will not effectively displace resin from a weaker aromatic solvent-gel system. It was noted that the rate of column flow decreased when using ethyl alcohol as a desorbent. The difference between the complete desorption with alcohol and that of MEK is important because it indicates that other oxygen containing solvents may be used in the delineation of the more highly adsorbed resin components.

The feed stock referred to as "phthalate alkyd" was an alkyd of Soya Oil and maleic and phthalic anhydride analyzed to contain 40.8% acid anhydride based on solids and calculated as phthalic anhydride. Selected cuts from ilar in molecular size. See Table II for comparable results.

TABLE II.—SCANNING OF PRODUCT ON A PERKIN-ELMER I.R. SPECTROPHOTOMETER

| Cut | Solvent | Yield, wt. percent | A. of OH $(2.9\mu)$; A. of CH $(3.4\mu)$ | A. of C—O $(5.8\mu)$; A. of C—H $(3.4\mu)$ | A. of phthalate $(13.5\mu)$; A. of C—H $(3.4\mu)$ |
|---|---|---|---|---|---|
| 1 | TMB | 0.0-34.2 | 0.391 | 4.94 | 1.06 |
| 2 | TMB | 34.2-42.6 | 0.543 | 2.59 | 0.692 |
| 3 | MEK | 42.6-73.3 | 0.414 | 1.33 | 0.674 |
| 4 | MEK | 73.3-95.3 | 0.571 | 1.52 | 0.709 |
| 5 | E+OH | 95.3-100.0 | 0.835 | 2.38 | 0.948 |

In Table I the quantity of hydroxyl, carbon-oxygen, phthalate bondings are compared to carbon-hydrogen.

It was observed that films left in the aluminum dishes from the non-volatile determinations gave evidence as to the difference in chemical nature. The films resulting from samples of the cuts analyzed by infrared were hard and smooth, hard and wrinkled, sticky fluid, sticky film, and tacky film after drying.

EXAMPLE III

Alkyd resin as described in Example I was diluted (1:2) with a 50-50 blend of isooctane and xylene. The silica gel column was prewetted with the same blend and following adsorption of the resin on the column, the column was washed with the same material, whereupon only 2.5% of the adsorbent solids was eluted.

Using an 80-20 blend of xylene and mixed hexanes, a net yield of about 43.6% solids was recovered, i.e. about as with xylene alone. A 60-40 by volume blend of xylene and hexane gave a selective elution of about 23.6% with 17% more being recovered using xylene alone.

These results are indicative that selective fractionation of the resin can be realized by blending aliphatics (paraffins) with aromatics and in the range of about 20–50% by volume of the weaker solvent to selectively elute more easily desorbed fractions, and, as a corollary, more tightly adsorbed fractions can be selectively desorbed using a higher solvency blend of aromatics and a ketone. For example, an 80-20 xylene-MEK blend yielded 50% of the adsorbed resin, as compared to 43% for xylene above. A 60-40 volume present blend of xylene-MEK desorbed 65% of the adsorbed resin. Final fractions of such a resin are eluted using alcohol. The data indicates that specific amounts of solute are desorbed from adsorbent by using solvent blends of definite composition.

EXAMPLE IV

A more viscous sample of the foregoing resin was passed over adsorbent prewet as described above. The desorption results using various blends of cyclohexane or heptane with trimethyl benzene and a final ethyl alcohol desorption are shown in the following table:

SOLVENT BLEND DESORPTION DATA

| Run | 19 | 20 | 21 |
|---|---|---|---|
| 1st desorption: | | | |
| Solvent (1) | 20% cyclohexane | 40% cyclohexane | 40% heptane. |
| Solvent (2) | 80% TMB | 60% TMB | 60% TMB. |
| Yield, percent | 49.6 | 52.5 | 16.0. |
| 2nd desorption: | | | |
| Solvent (1) | | 30% cyclohexane | 30% heptane. |
| Solvent (2) | Trimethyl benzene | 70% TMB | 70% TMB. |
| Yield, percent | 0.1 | 0.1 | 5.1. |
| 3rd desorption: | | | |
| Solvent (1) | | 20% cyclohexane | 20% heptane. |
| Solvent (2) | Ethyl alcohol | 80% TMB | 80% TMB. |
| Yield, percent | 50.3 | 0.0 | 25.8. |
| 4th desorption: | | | |
| Solvent (1) | | 20% alcohol | 50% heptane. |
| Solvent (2) | | 80% TMB | 50% alcohol. |
| Yield, percent | | 46.2 | 52.5. |
| 5th desorption: | | | |
| Solvent | | Ethyl alcohol | Ethyl alcohol. |
| Yield, percent | | 1.3 | 0.6. |

EXAMPLE V

A low viscosity alkyd, i.e. a "pentarythrital" TME modified soya alkyd having a 48.5% NVM and an H range viscosity, was used as a feedstock. An elutriant blend of 60% isoctane, 20% xylene and 20% MEK by volume desorbed 69% of this resin as compared to only 10% for the foregoing phthalate resin in the first desorption step. This resin was somewhat difficult to retain on the silica gel. Therefore, lactol spirits comprising 90% paraffin and naphthenic and 10% aromatic solvent with a boiling range between 200 and 220° F. was used as first desorbent.

Using a six foot column containing about one pound of gel, 200 grams of the non-volatile pentacrythrital TME modified soya alkyd resin were fed into the reactor. The adsorbed resin was then displaced, using "lactol" spirits yielding about 20% eluted material each in two portions, followed by 10% MEK and 20% MEK in the "spirit" solvent as second and third desorbents, followed by a 50% MEK-50% ethanol purge. The feedstock resin was thereby fractionated into five or six increments, but as many as desired can be had by taking successive cuts.

The separated fractions had significant different properties. The first fraction was almost too viscous to pour out of a vacuum still (used for removing solvent from product components) at 25% NVM with a distillation temperature over 150° F. The remaining half of the lactol eluted stock, about 40% of the yield, gelled when the solids content reached 40 to 50% during a lower temperature evaporation. The MEK-lactol spirit eluted fractions were evaporated to 84, 66 and 63% NVM respectively and redissolved with no difficulty. These fractions had significantly different Gardner-Holdt viscosities respectively with different cure rates, colors, infrared spectra, etc., all indicating that different molecular species had been quite separated. This adsorbate was found to contain much unreacted (referring to the cooking of varnish) material and about 40% of better than 10,000 molecular weight. Much of the 15,000 average molecular weight components had simply been large for the pore openings and would have been eluted with any compatible desorber.

EXAMPLE VI

A study was made by blending ethyl, isopropyl, and butyl alcohols with a paraffin, namely diisopropyl, and a naphthene, namely cyclohexane. Ethyl alcohol was somewhat better as a desorber than the other two alcohols. It could be expected that methyl alcohol would perform similarly. The diisopropyl inhibited complete removal of the resin from the gel. See Chart I. The results from blending cyclohexane with ethanol are comparative with that of aromatic-alcohol mixtures in that essentially complete solute desorption is accomplished. Cellosolve has more capability than alcohol in removing adsorbate from the gel.

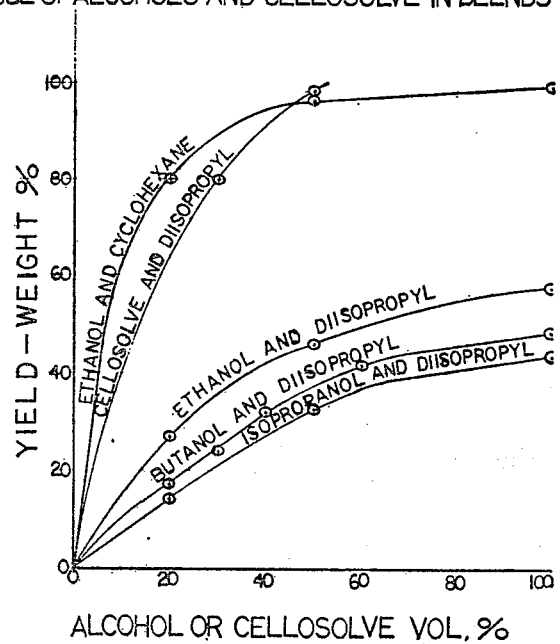

CHART I
USE OF ALCOHOLS AND CELLOSOLVE IN BLENDS

ALCOHOL OR CELLOSOLVE VOL, %

Applicant preferably uses what may be termed a "resonant" elution technique which comprises the adding of the original diluting solvent immediately following (perhaps allowing for drainage of liquid equal to up to one-third of the total gel volume) the final wash solvent of a previous run. In this manner, the final strong, expensive desorbing solvents used in the final washing are desorbed and replaced by the original, weaker and less expensive diluting solvent to provide gel reactivation without requiring the regeneration processes now utilized.

It has also been shown that the gel may be regenerated by heating at approximately 200° and then purging the column under air pressure of three to four pounds. Inert gas such as $CO_2$ or nitrogen may also be used, as they would not contribute to coking or other deleterious reactions.

This regeneration or removal of a large share of the final wash solvent at around 180-200° F. produces approximately the original weight of the gel repeatedly over an indefinite period of time. However, a gel reactivation by solvent exchange, that is the replacing of the final more expensive wash solvent by the initial, cheaper wash solvent, appears to be a more economical method and has been proven to be effective in delineating feed components during at least 20 recycle operations. A detailed study illustrated that methyl ethyl ketone and alcohol were essentially displaced from the gel by moderate amounts of toluene. Toluene can be replaced by less powerful solvents. Many possibilities exist in solvent exchange procedures, not the least of which will include studies of aqueous systems. In addition, the gel reactivation by solvent exchange substantially eliminates any possibility of channeling.

Many solvents may be used, but those which are preferably used are acetone, ethyl alcohol, diisopropyl, mixed hexanes, methyl ethyl ketone, isooctane, methyl isobutyl ketone, ethyl acetate, methyl cellosolve, ethyl cellosolve, aliphatic solvent, VM & P naphtha, cyclohexane, methylene chloride, ethylene glycol, ethylene chloride, carbon tetrachloride, toluene, xylene, and benzene. Single solvents used in series are quite satisfactory.

Various feed stocks, such as the three categories, (1) a varnish which is a bodied oil plus resin, (2) a polyester which is a condensation product of acid (dibasic) and alcohol (polyhydric), and (3) an alkyd which is an oil modified polyester, were utilized and the various blended solvents used to wash the same to provide the desired gradual elution of the same. Samples of typical vehicles, such as a medium length linseed tung modified phenolic, a polyester gel coat vehicle, and a soya P.E. phthalate alkyd were used as adsorbate. Each of these vehicles has a different solubility in the different solvents used and, therefore, are eluted at different rates after being poured into the chromatographic column and absorbed by the silica gel.

Various tars, asphalts, resinous by-products and even some pharmaceutical or food compositions can be dissolved in a solvent to provide a feedstock suitable for treatment in the process of the invention. The concentration of solute will usually be in the range of about 5 to 25%, by weight, of non-volatile material (NVM). Generally, amounts to about 10 to 20% will be found satisfactory. Heavier petroleum fractions may be less dilute as adsorbates as they are considerably lower in molecular weight than coating vehicles.

In the use of this silica gel chromatography process set forth above, the final cost of using same may be reduced to pumping, storage, vacuum distillation, and recovery of solvent. In addition, this provides a diluting solvent for product solute increments which may replace methyl ethyl ketone, alcohol, or expensive liquefying agents for higher molecular weight compounds.

Therefore, it can be seen that an advantageous, new and unique process operable at variable low pressures, room temperature, and utilizing a highly porous silica gel has been disclosed. The process allows a controlled fractionation of different size molecular particles to enable coating films to be built of more selective sizes, shapes, and/or species than is now available. In this manner, superior film qualities, such as in varnishes, are obtainable, and other types of medicines, foods, chemical, petroleums, and the like having a composite of molecular sizes and structures may be utilized and modified in any desired way.

While the invention has been described in considerable detail, it is not to be limited to the details as have been set forth, except as may be necessitated by the appended claims.

I claim:

1. A method of fractionating liquid or dissolved high molecular weight organic compounds on an industrial scale comprising, in a liquid-solid chromatographic column wherein there is provided in a non-aqueous fluid phase, a solid adsorbent of silica gel having a mesh size of less than about 100 mesh, a pore volume of more than 0.40 cc./gram, an average pore diameter of more than 22 angstroms and of durable composition; wetting the silica gel with a mild desorber to regenerate and prevent channeling in the gel; contacting said silica gel with said organic compounds in a pressure range of atmospheric to 1000 p.s.i.g.; adding solvents in sequence to the column to wash said silica gel and desorb the separated higher molecular weight compounds therefrom.

2. The method in Claim 1 wherein the desorbing solvents are selected from the groups consisting of aliphatics, naphthenes, aromatics, petroleum distillates, aniline, esters, ketones, alcohols, phenols, cellosolve, chlorinated compounds, and blends thereof.

3. The method of Claim 1 further including as the final desorbing solvent an azeotropic mixture of an aliphatic alcohol and a solvent selected from the group consisting of naphthenes, aromatics, petroleum distillates, aniline, esters, ketones, phenol, cellosolves, and chlorinated compounds.

4. The method in Claim 1 wherein the mild desorber is a relatively low-power solvent.

5. The method in Claim 1 wherein the mild desorber is a feedstock component.

6. The method in Claim 1 wherein adsorption of organic compounds is carried out at ambient temperature.

7. The method in Claim 6 wherein the organic mixture is an alkyd resin diluted with toluene, the first desorbent is toluene, the second desorbent is methyl ethyl ketone, and the third desorbent is ethyl alcohol.

8. The method in Claim 1 wherein the organic mixture is a bodied oil plus resin diluted with petroleum distillate, the first desorbent is petroleum distillate, the second desorbent is toluene and methyl ethyl ketone, and the third desorbent is alcohol.

9. The method in Claim 1 wherein the organic mixture is a condensation product of organic acid and polyhydric alcohol diluted with an aromatic, the first desorbent is an aromatic, the second desorbent is an aromatic and ketone, the third desorbent is alcohol.

10. A method of fractionating medium and high molecular weight organic compounds on an industrial scale comprising, in a liquid-solid chromatographic system wherein there is provided in a non-aqueous fluid phase, a solid adsorbent of silica gel having a mesh size of less than about 100 mesh, a pore volume of more than 0.40 cc./gram, an average pore diameter of more 22 angstroms and of durable composition; wetting the silica gel with mild desorber to regenerate and prevent channeling in the gel; contacting said silica gel with said organic compounds in a pressure range of less than 1000 p.s.i.g.; adding solvent to the column to wash said silica gel and desorb the separated organic compounds therefrom.

(References on following page)

References Cited

UNITED STATES PATENTS 3,350,174 10/1967 Mattenheimer _____ 210—31 C
3,706,661 12/1972 Tangen et al. _____ 210—31 C

OTHER REFERENCES

Chromatography by Heftmann, Reinhold Publishing Corp., New York (1961), pp. 692–696 relied on.

The Isolation of a New Resin Acid from Gum Resin, by Loeblich et al. A reprint from the Journal of the American Chemical Society (1955).

JOHN ADEE, Primary Examiner

U.S. Cl. X.R.

55—386